United States Patent [19]

Kawamura

[11] 4,283,217
[45] Aug. 11, 1981

[54] METHOD OF FORMING A SHAPED FLUORESCENT LIGHT BULB ENVELOPE

[76] Inventor: Osamu Kawamura, Koganehara No. 2-13-13, Matsudo-Shi, Chiba-Ken, Japan

[21] Appl. No.: 71,185

[22] Filed: Aug. 31, 1979

Related U.S. Application Data

[63] Continuation of Ser. No. 798,014, May 18, 1977, abandoned.

[51] Int. Cl.³ ............................................. C03B 29/00
[52] U.S. Cl. ..................................... 65/108; 65/110; 65/277; 65/281; 313/182; 316/30
[58] Field of Search ................... 65/87, 108, 109, 110, 65/276, 277, 281, 282

[56] References Cited

U.S. PATENT DOCUMENTS

| 1,534,685 | 4/1925 | Claude et al. | 65/108 |
| 2,177,743 | 10/1939 | Pfaff | 65/87 X |
| 3,309,187 | 3/1967 | Drangeid | 65/108 X |

Primary Examiner—Robert L. Lindsay, Jr.

[57] ABSTRACT

An elongated envelope for a fluorescent light bulb is held at each of its ends, and heated to a degree by which it is bendable. The ends are then moved relatively to each other in a path by which they are turned inwardly in opposition to each other and toward the center portion of the envelope while being directed out of the plane of the center portion to in part overly the center portion.

5 Claims, 32 Drawing Figures

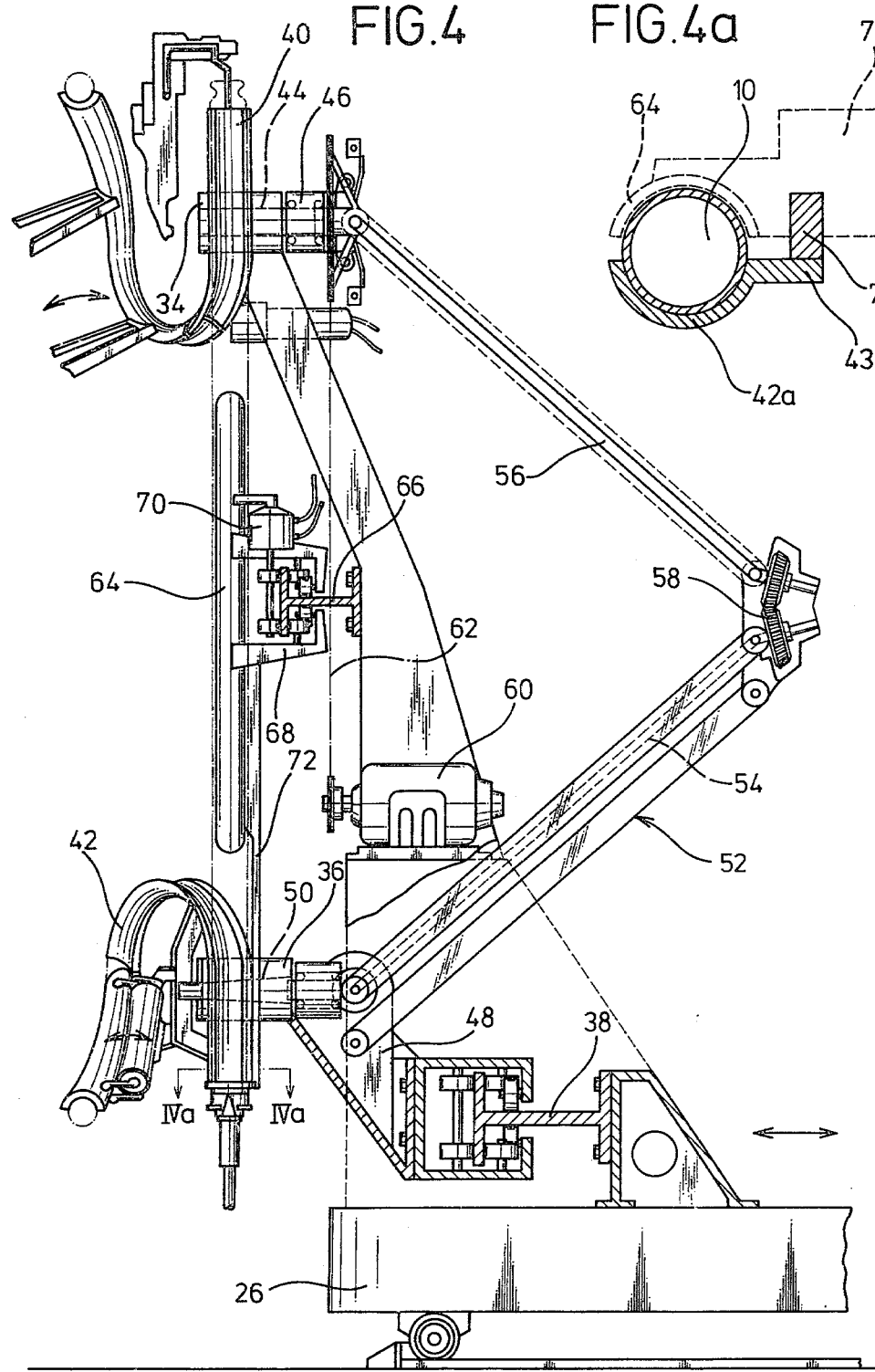

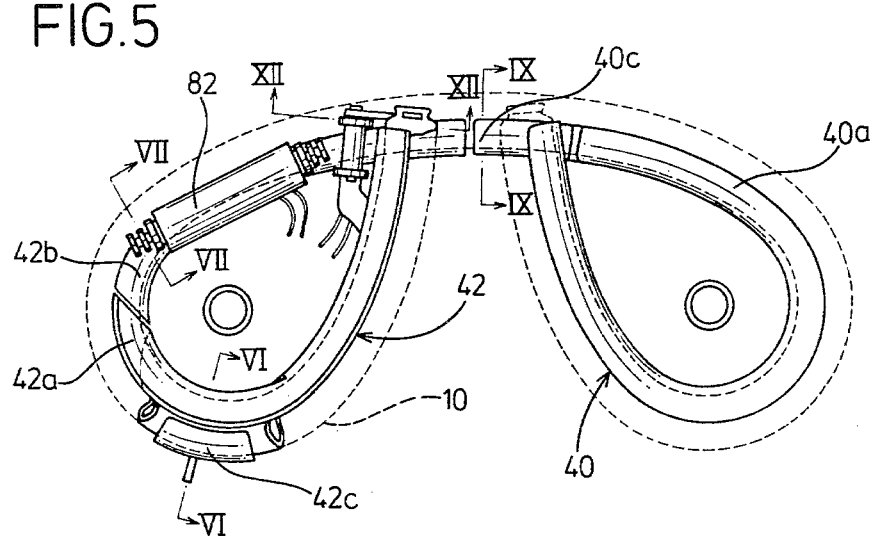
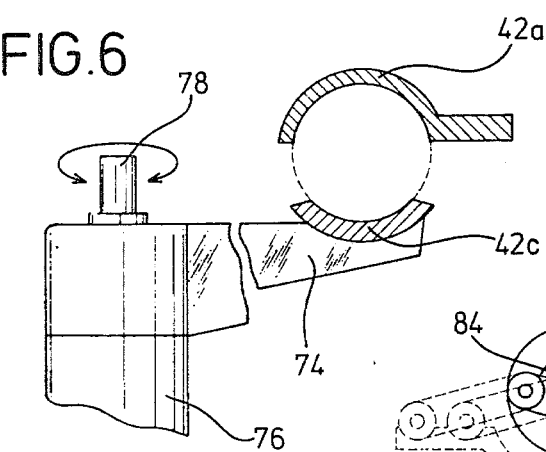
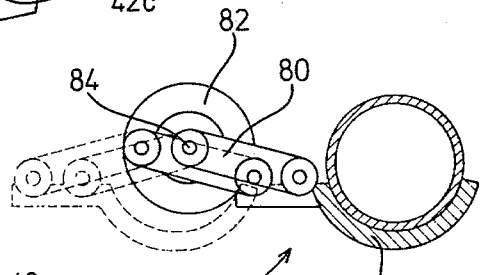
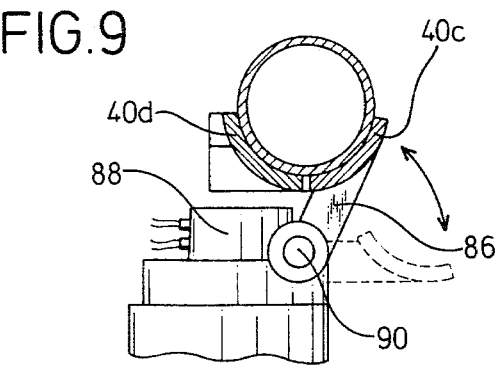

METHOD OF FORMING A SHAPED FLUORESCENT LIGHT BULB ENVELOPE

This is a continuation of application Ser. No. 798,014, filed May 18, 1977, and now abandoned.

This invention relates to a method of and an apparatus for manufacturing a curved or bent fluorescent lamp.

Heretofore, two types of the fluorescent lamp including an elongated lamp and an annular or so-called circline fluorescent lamp have been commercially offerred. Generally, the manufacture of the elongated fluorescent lamp is fundamental and the annular fluorescent lamp is manufactured by bending the straight lamp bulb under an appropriate heat treatment with a convenient bending machine. As a bending configuration an annular or circline shape is convenient in design and manufacture to obtain a homogeneous quality of the product.

However, the fluorescent lamp having a complicate configuration or shape entails many difficulties in manufacture and requires cumbersome hand work which is unsuitable for a mass production.

The conventional linear and annular fluorescent lamps have been generally used as illumination applicances with decorated shade or other lamp carriers which limit illumination by the fluorescent lamp. To compensate for the lowered illumination of the fluorescent lamp a number of the lamps have been used with a considerable consumption of power.

To overcome the defects and inconveniences of the conventional fluorescent lamps in accordance with the present invention, an elongated fluorescent lamp bulb has its opposite ends symmetrically bent and stretched to a position over the middle portion of the lamp bulb to obtain a fluorescent lamp having a graceful curvature by a comperatively simple bending operation.

In the manufacture of the fluorescent lamp in accordance with the present invention, the conventional steps for manufacturing the straight fluorescent lamp bulb including the commencement of the heating step have been employed in their entirties and an improvement has been directed to the bending operation. Namely, the elongated fluorescent lamp bulb at its opposite ends are held for heating by means of a convenient heater and softened sufficiently for bending and subsequently one of the bulb ends is fixed while the opposite bulb end is subjected to a planetary turning for approximately 250° closing to the fixed bulb end by slow degree so that the linear fluorescent bulb is bent smoothly while retaining a balance of symmetry.

During the bending operation, in order to extend opposite ends of the fluorescent lamp bulb to the position over an intermediate portion thereof support members are passed through the nodal portions of the opposite ends of the lamp bulb. The supports are provided with spiral guide channels which determine the bending direction and shape.

The curved or bent fluorescent lamp in accordance with the present invention has graceful and increased curvatures as compared with the conventional annular fluorescent lamp. This enables the manufacture of a fluorescent lamp of a great output and illumination despite its limited space occupation.

It is therefore a general object of the invention to provide a method of and an apparatus for manufacturing a fluorescent lamp having a solid crossing configuration with relatively simple operation.

In one aspect of the invention, there is provided a process for manufacturing a bent fluorescent lamp which comprises steps of preparing a a straight fluorescent lamp bulb, heating the straight lamp bulb, holding opposite ends of the hot lamp bulb for bending and leading in parallel and contrast until they come to a position over an intermediate portion of the lamp bulb, exhausting the lamp bulb and subsequently introducing an ionizing gas thereinto for sealing and securing electric connectors to opposite ends of the lamp bulb.

In the step of holding the opposite ends of the hot lamp bulb for symmetrical bending, one end of the lamp bulb is fixed whereas the opposite end thereof is preferably subjected to a planetary turning for approximately 250° so as to gradually draw the end close to the fixed end.

In another aspect of the invention, there is provided an apparatus for manufacturing a bent fluorescent lamp bulb which comprises means for preparing a straight or elongated fluorescent lamp bulb and a rotary disc means for sequentially suspending the elongated fluorescent lamp bulbs for heating, bending, exhausting, introducing an ionizing gas and subsequent sealing. One end of the fluorescent lamp bulb is fixed at a bend working position of the rotary disc means through a stationary holder whereas the opposite end thereof is held by a movable holder adapted to conduct a planetary turning along a guide track for bending and a movable bending means for bending symmetrically opposite ends of the fluorescent lamp bulb until they come to a position over an intermediate portion of the lamp bulb.

In the foregoing apparatus, two holders of the bending means are coupled through a pantagraph link which is provided with a turning transmission mechanism to obtain a planetary turning of the movable holder around the stationary holder under the operation of a reversible motor.

The stationary and movable holders are preferably provided with spiral guide channels for bending opposite ends of the fluorescent lamp bulb in a solid crossing relation. The guide channels may preferably be of divisible and individual guide channel member is displaceable under the operation of a torque actuator for the smooth separation of the bent fluorescent lamp bulb from the apparatus.

In order to prevent any undesired distorsion of the fluorescent lamp bulb during the bending operation, it is preferred to provide a receiving plate which is in contact with an intermediate portion of the fluorescent lamp bulb and moved along a curved track synchronously with the movement of the movable holder under the operation of the reversible motor.

The curved track for making a planetary turning of the movable holder is extended at a curvature of approximately 250°.

From the foregoing description, it will be appreciated that a further aspect of the invention is directed to a fluorescent lamp in which opposite erds of the lamp bulb are bent in parallel to a commor direction and stretched until they come to a position over an intermediate portion of the fluorescent lamp bulb.

The opposite ends of the bent fluorescent lamp may selectively be connected to a common or independent cap inclusive of electric terminals. The common cap is comprised of an elongated casing which is provided at its one side with two openings for receiving opposite ends of the fluorescent lamp and at the other position than said two openings with a recess for receiving electric terminals.

Other objects and advantageous features of the invention will be apparent from the description and claims.

The nature and characteristic features of the invention will be more readily understood from the following description taken in conjunction with the accompanying drawings forming part thereof, in which:

FIG. 4 is a longitudinally sectioned view taken along the line IV—IV of FIG. 3;

FIG. 4a is a sectional view taken along line IVa—IVa of FIG. 4;

FIG. 5 is a pictorial plan view of the guide channel member for the fluorescent lamp bulb;

FIG. 6 is a sectional view of the guide channel member taken along the line VI—VI of FIG. 5;

FIG. 7 is a sectional view taken along the line VII—VII of FIG. 5;

FIG. 9 is a sectional view taken along the line IX—IX of FIG. 5;

The method of preparing the bent fluorescent lamp in accordance with the invention will be hereinafter fully described in connection with the apparatus therefor.

As hereinbefore described, in the process for preparing the bent fluorescent lamp in accordance with the present invention, a part of the conventionally exercised step for preparing the circline fluorescent lamp has been introduced. Namely, in the conventional process for preparing the circline fluorescent lamp, an elongated fluorescent lamp bulb is prepared and placed in an appropriate heating zone for heating to the temperature sufficient to bend the lamp bulb and subsequently opposite ends of the lamp bulb are held and both bent in a common plane to obtain a circline or annular bulb and then the bulb is exhausted and sealed with an ionizing gas and fixed with electric connectors.

In accordance with the present invention, an elongated lamp bulb is heated and opposite ends of the lamp bulb are held for bending and leading in parallel and contrast until they come to the position over an intermediate portion of the lamp bulb.

Figure 1:
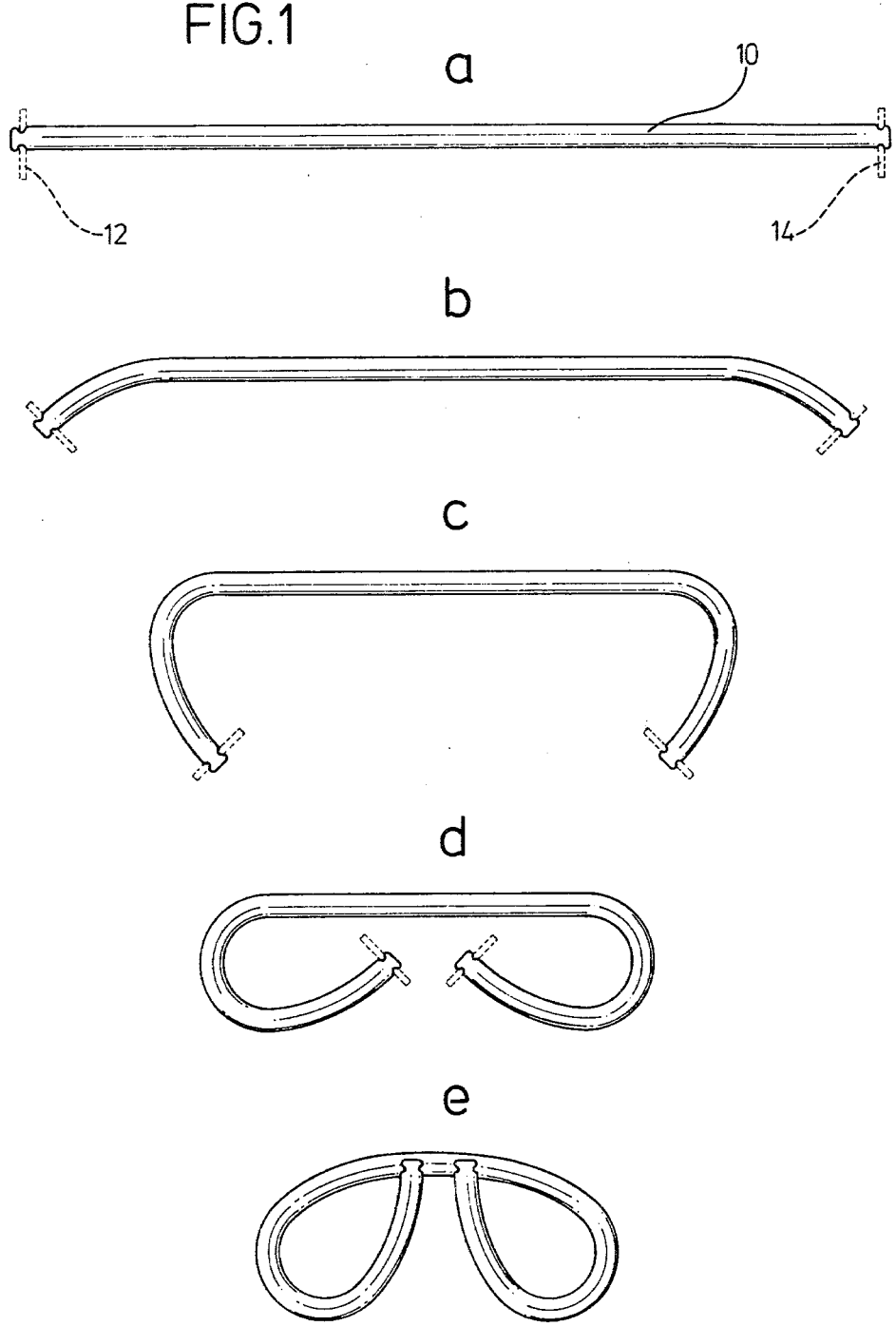
FIG. 1 is a front elevation of the fluorescent lamp in each bending stage of from a to e.

In FIG. 1, the bending operation of the fluorescent lamp bulb in accordance with the present invention is illustrated in order. Namely, an elongated fluorescent lamp bulb 10 is heated to a temperature suitable to the bending of the bulb which is approximately 700° C. and the opposite ends of the hot bulb 10 are held by means of the holders 12 and 14 as shown in FIG. 1a. The holders 12 and 14 are swivelled relative to each other symmetrically at the turning angles of approximately 250° in a predetermined direction to approach with each other until they come to a position over an intermediate position of the bulb body as shown in FIG. 1e. Preferably one end is held stationary while the other end is moved in a planetary path about it.

Figure 2:
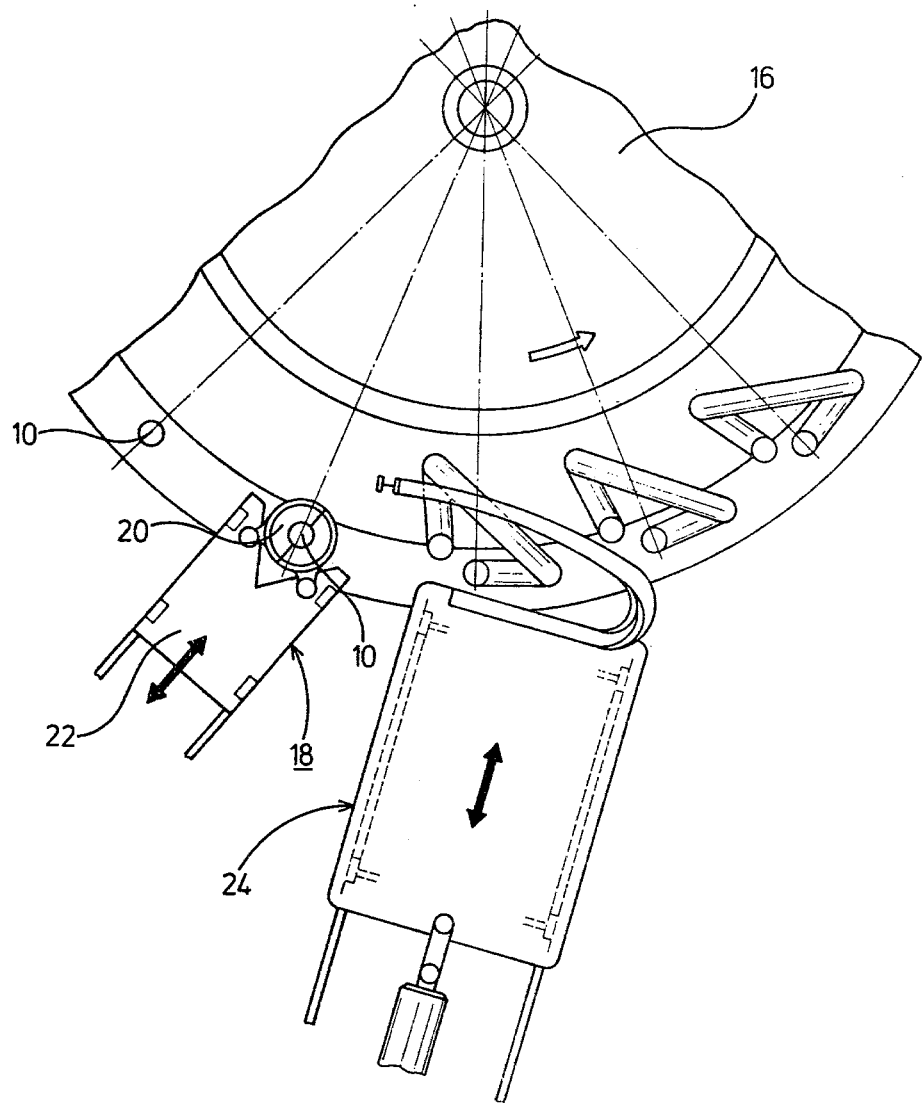
FIG. 2 is a fragmentarily enlarged pictorial view of an apparatus for manufacturing a fluorescent lamp in accordance with the present invention.

To achieve smooth turning operations of the holders, the bulb body is also constrained to turn by means of an apparatus as illustrated in FIG. 2 in which a turnable work disc 16 is arranged to carry an elongated fluorescent lamp bulb for an intermittent turning so that the operations of heating, bending, exhausting, and sealing of an ionizing gas are carried out at each turning position.

At first, the elongated fluorescent lamp bulb is vertically held in the work disc 16 and heated at the heating zone by means of a heater 18 which is movable in the radial direction against the work disc 16.

The heater 18 is comprised of a heating sleeve 20 which is divided into two parts for open and close and a support plate 22 for carrying the heating sleeve 20 and movable in synchronous with the intermittent turning motion of the work disc 16. The fluorescent lamp 10 heated at the heater 18 is carried by the next intermittent movement of the work disc 16 to the position where the bulb is subjected to the bending operation by a bending means 24.

Figure 3:
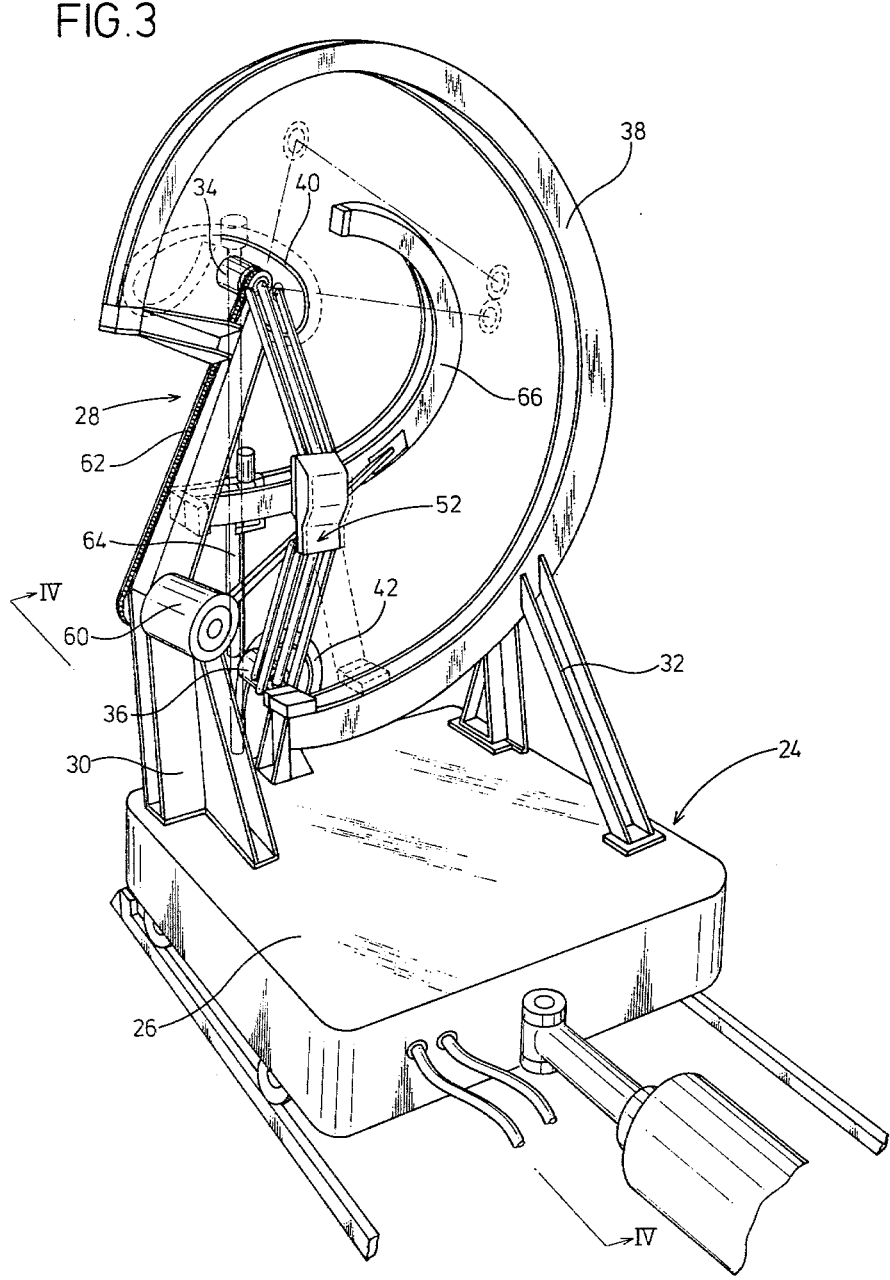
FIG. 3 is a perspective view of the apparatus in accordance with the invention.
Figure 8:
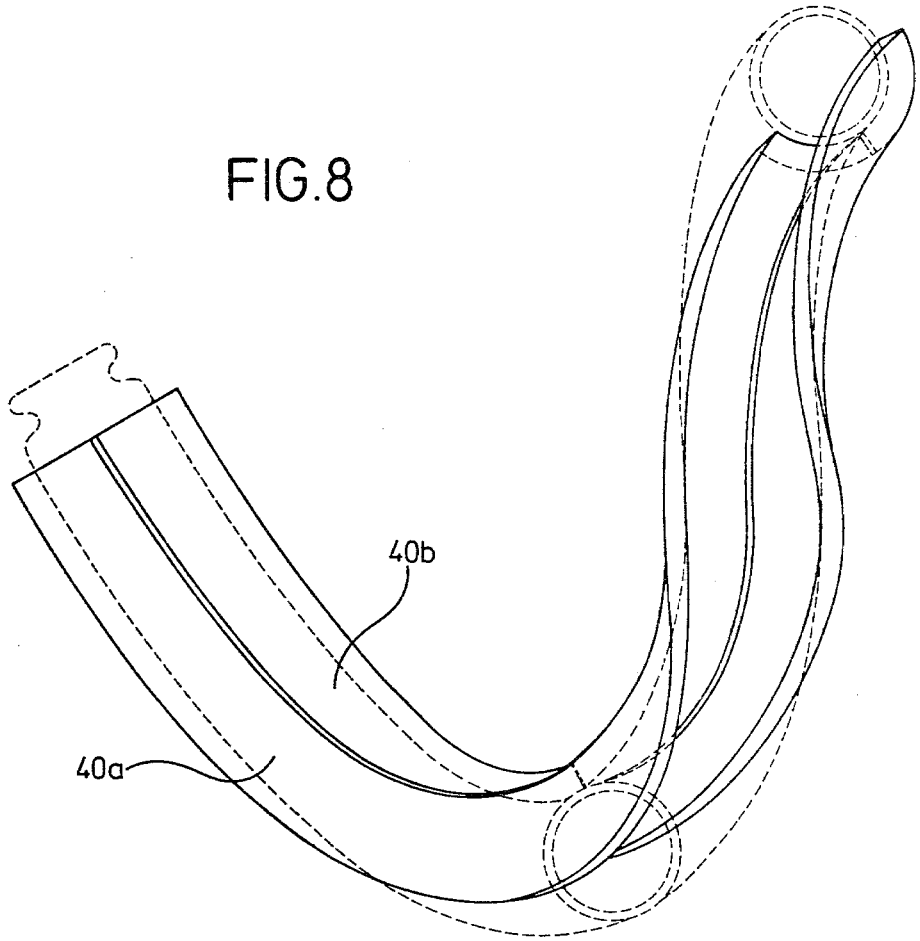
FIG. 8 is a perspective view of the guide channel member of FIG. 5.

In FIGS. 3 and 4, the bending means 24 includes a mobile bed 26 and a bending mechanism 28 mounted on the bed 26 through the support members 30 and 32. The bending mechanism provides a holder 34 adapted to suspend one end of the vertically positioned fluorescent lamp bulb 10, a holder 36 adapted to bear the opposite end of the fluorescent lamp bulb 10 and a guide track 38 with the support member 32 for leading the holder 36 upwardly along an arc. One end of the guide track 38 is preferably secured to the support member 30 to increase a stability thereof. The holder 34 is associated with a spiral guide channel member 38 whereas the holder 36 is associated with a spiral guide channel member 42 so that the holder 36 is turned along the guide track 38 and around an axis of the holder 34 at approximately 250°. To a rigid axis 44 of the holder 34 supporting the spiral guide channel member 40 is mounted a revolving sleeve 46.

As shown in FIG. 4, the holder 36 provides a frame member 48 movably connected to the guide track 38 and a shaft 50 turnably pivoted to a part of the frame member 48. The holders 34 and 36 are associated with each other through a pantagraph link 52 which is provided with turning power transmission shafts 54 and 56 connected through a bevel gear mechanism 58. One end of the power transmission shaft 56 is connected to the sleeve 46 whereas the opposite end of the power transmission shaft 54 is connected to the rotary axis 50 to transmit a driving force of a reversible motor 60 to the sleeve 46 through a chain 62 so that the holder 36 is subjected to a planetary turn along the guide track 38 as hereinbefore described.

The guide track 38 is so arranged that the radial distance against a pivotal point of the pantagraph link 48 at the stationary holder 34 is gradually reduced and by this arrangement the bending operation of the fluorescent lamp bulb 10 in accordance with the invention may be accomplished.

To turn the fluorescent lamp bulb for bending, an intermediate portion of the bulb 10 is carried by a receiver plate 64 which moves in synchronism with the movement of the pantagraph link 52. The receiver plate 64 is preferably associated with a second track 66, leading the receiver plate 64 to carry an intermediate portion of the bulb 10 and mounted with a support member 68 so that the receiver plate 64 is moved along the second track 66 under the operation of a reversible motor 70.

In the bending means 24, engagement between the frame 48 of the movable holder 36 and the guide track 38 and between the support member 68 of the receiver plate 64 and the track 66 is obtained with use of convenient numbers of the rollers. To obtain a smooth bending operation of the fluorescent lamp bulb in accordance with the invention, the reversible motors 60 and 70 may preferably be of an electric motor or a hydraulic motor which is so designed that the driving speed is reduced on start and stop.

When the hot fluorescent lamp bulb 10 comes to the bend working position, the bending means 24 is moved against the fluorescent lamp 10. In this operation, the holders 34, 36 and the receiver plate 64 are somewhat displaced from the contacting position with the bulb 10 as shown by the dotted line in FIG. 3 and when the bed 26 arrives at the predetermined working position these holders 34, 36 and the receiver plate 64 are moved to the contacting position with the fluorescent lamp bulb for holding thereof. Further, to avoid any excessive contacting pressure of the receiver plate 64 against the vertically arranged fluorescent lamp bulb an extended portion 72 is provided in contact with the holder 36 so that any generation of distortion of the fluorescent lamp bulb is avoided.

The reversible motors 60 and 70 drive synchronously subjecting the movable holder 36 to the planetary turning around the stationary holder 34 while carrying the intermediate portion of the fluorescent lamp bulb 10 through the receiver plate 64. Thus, it will be appreciated that turning of the holder 36 for approximately 250° against the holder 34 brings bending of the elongated fluorescent lamp bulb 10 from the shape a to e as seen in FIG. 1.

Moreover, the guide track 38 for guiding the movable holder 36 and the track 66 for guiding the receiver plate 64 are provided at their opposite ends with convenient stoppers so that when the movable holder 36 and the receiver plate 64 arrive at the terminal ends the reversible motor 60 and 70 are independently actuated to make a reverse drive for returning the holder 36 and the receiver plate 64 to their original positions.

As hereinbefore described, the holders 34 and 36 are provided with the guide channel members 40 and 42 to obtain a solid curve of the fluorescent lamp bulb. Separation of these members 40 and 42 from the curved bulb may be effected in the manner illustrated in FIGS. 5 to 10.

The guide channel member 42 mounted to the movable holder 36 is divided into two parts against the longitudinal direction of the fluorescent lamp 10 and one divided guide channel member 42a abutting to the holder 36 is connected through an arm 74 to a shaft 78 of a torque actuator 76 as shown in FIG. 6 whereas the other divided guide channel member 42b is connected through an arm 80 to a shaft 84 of an actuator 82 as shown in FIG. 7, so that the guide channel members 42a and 42b are separated from the fluorescent lamp bulb 10 under the operation of the torque actuators 76 and 82.

In FIGS. 6 and 7, a guide channel member 42c is provided to embrace the fluorescent lamp bulb 10 with the divided guide channel member 42a for preventing any undesired distorsion of the bulb during the bending operation thereof.

The guide channel member 40 provided in relation to the guide member 42 is divided into two parts along the circumference of the fluorescent lamp bulb 10 and one of the divided parts 40a is made movable with the bed 26 whereas the opposite divided guide channel member 40b is fixed together with the bent fluorescent lamp bulb 10.

As best shown in FIGS. 5 and 9, there are provided further divisional guide channel members 40c and 40d in which the member 40c is connected through an arm 86 to a shaft 90 of an actuator 88 as shown in FIG. 9, so that the fluorescent lamp bulb 10 is conveniently removed by displacement of the divisional guide channel member 40c.

Figure 11:
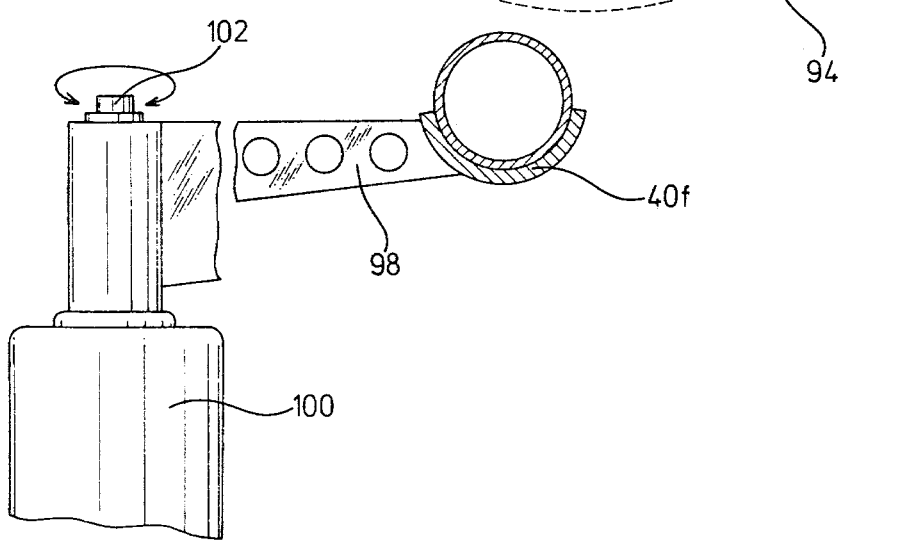
FIG. 11 is a sectional view taken along the line XI—XI of FIG. 10.

Alternately, the guide channel member 40 provided in relation to the fixed holder 34 is divisible along the longitudinal direction of the fluorescent lamp bulb and one of the divided part 40e of the guide channel member adjoining to the holder 34 is connected through an arm 92 to a shaft 96 of a torque actuator 94 whereas a guide channel member 40f is connected through an arm 98 to a shaft 102 of a torque actuator 100 as shown in FIG. 11, so that the divided guide channel members 40e and 40f are removed from the fluorescent lamp bulb 10 under the operation of the torque actuators 94 and 100.

Figure 12:
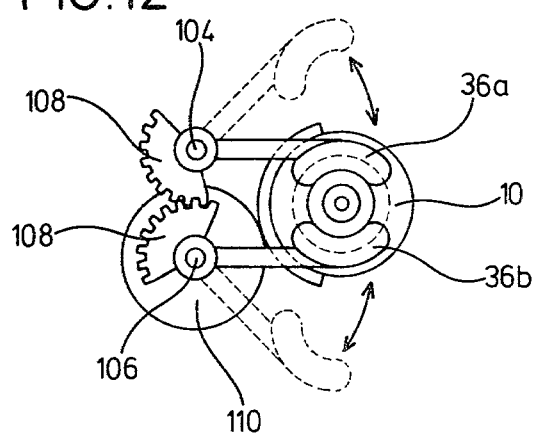
FIG. 12 is a sectional view taken along the line XII—XII of FIG. 5.
Figure 10:
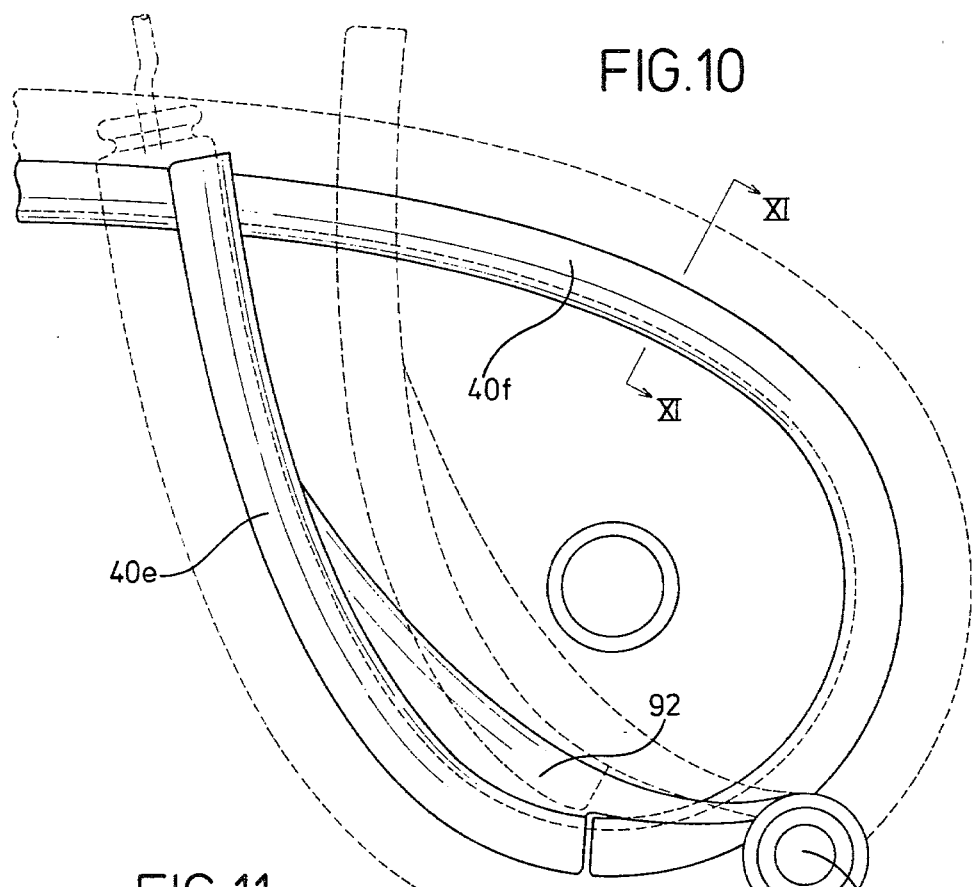
FIG. 10 is a pictorial plan view of the guide channel member of another embodiment.

The holder 36 for holding the opposite ends of the fluorescent lamp bulb 10 is typically comprised of holder pieces 36a and 36b which at their one ends are connected to gear segments 108, 108 which are journaled on a fixed shaft 104 and a turning shaft 106 derived from an actuator 110, so that the engagement and disengagement of holders 36 with the fluorescent lamp bulb 10 are carried out under the operation of the actuator as shown in FIG. 12.

Figure 13:
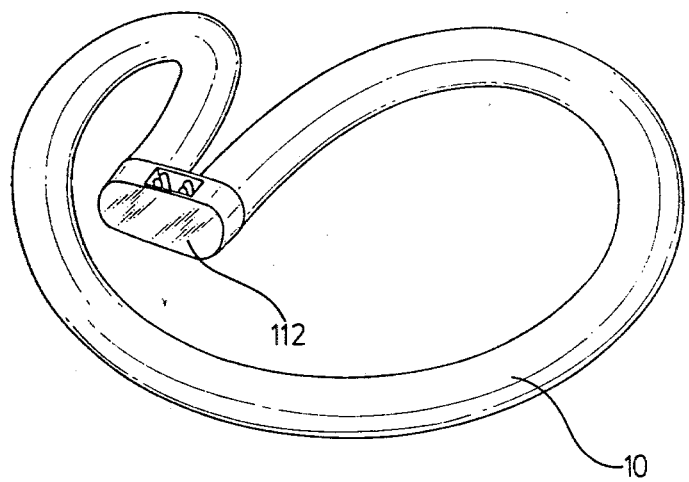
FIG. 13 is a perspective view of the fluorescent lamp manufactured in accordance with the present invention.
Figure 14:
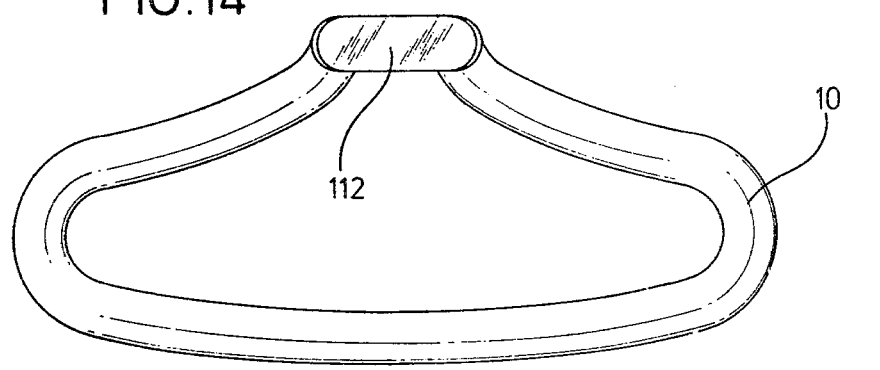
FIG. 14 is a front elevation of the fluorescent lamp of FIG. 13.
Figure 15:
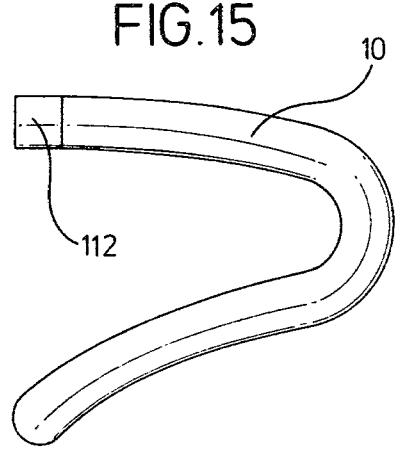
FIG. 15 is a lateral view of the fluorescent lamp of FIG. 13.

In the bend work position, the bent fluorescent lamp bulb after configured by the bending means 24 is disengaged from the means 24 and transferred to the next working position by the intermittent turning of the disc means 16. The fluorescent lamp bulb released from the bend work position is subsequently subjected to the conventional finishings including the steps of exhausting, sealing of an ionizing gas and providing the end caps for obtaining a finish product of the fluorescent lamp as best shown in FIGS. 13 to 15.

In the bent fluorescent lamp obtained in accordance with the present invention, the opposite ends of the lamp are aligned in juxtaposition and these ends are mounted with a single end cap 112 as hereinafter fully described.

Figure 16:
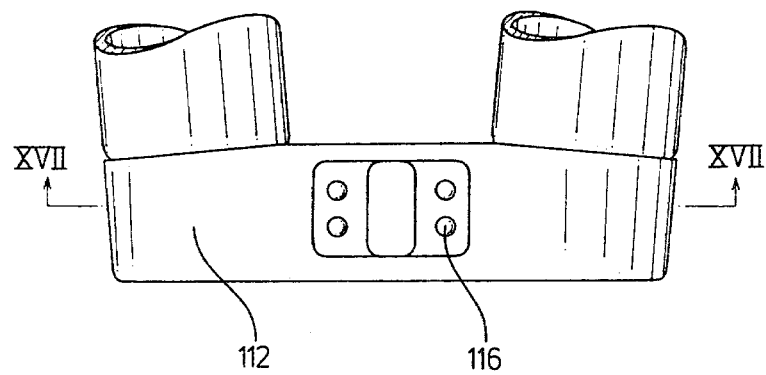
FIG. 16 is a plan view of an electric connecting terminal of the fluorescent lamp obtained in accordance with the invention.
Figure 17:
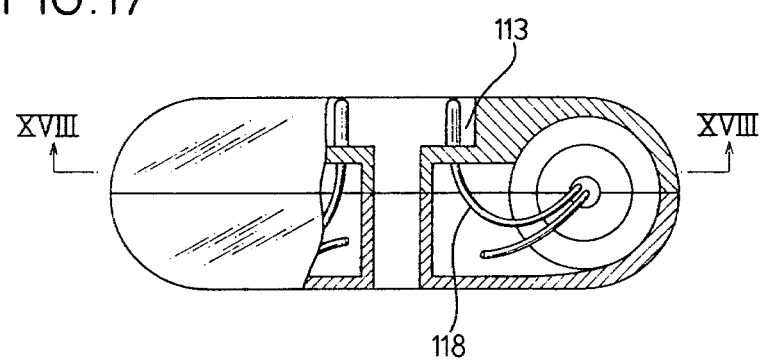
FIG. 17 is a cross sectional view taken along the line XVII—XVII of FIG. 16.
Figure 18:
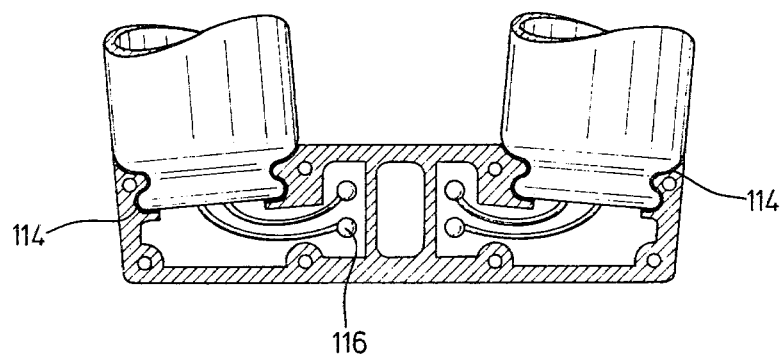
FIG. 18 is a longitudinally sectioned view taken along the line XVIII—XVIII of FIG. 17.
Figure 20:
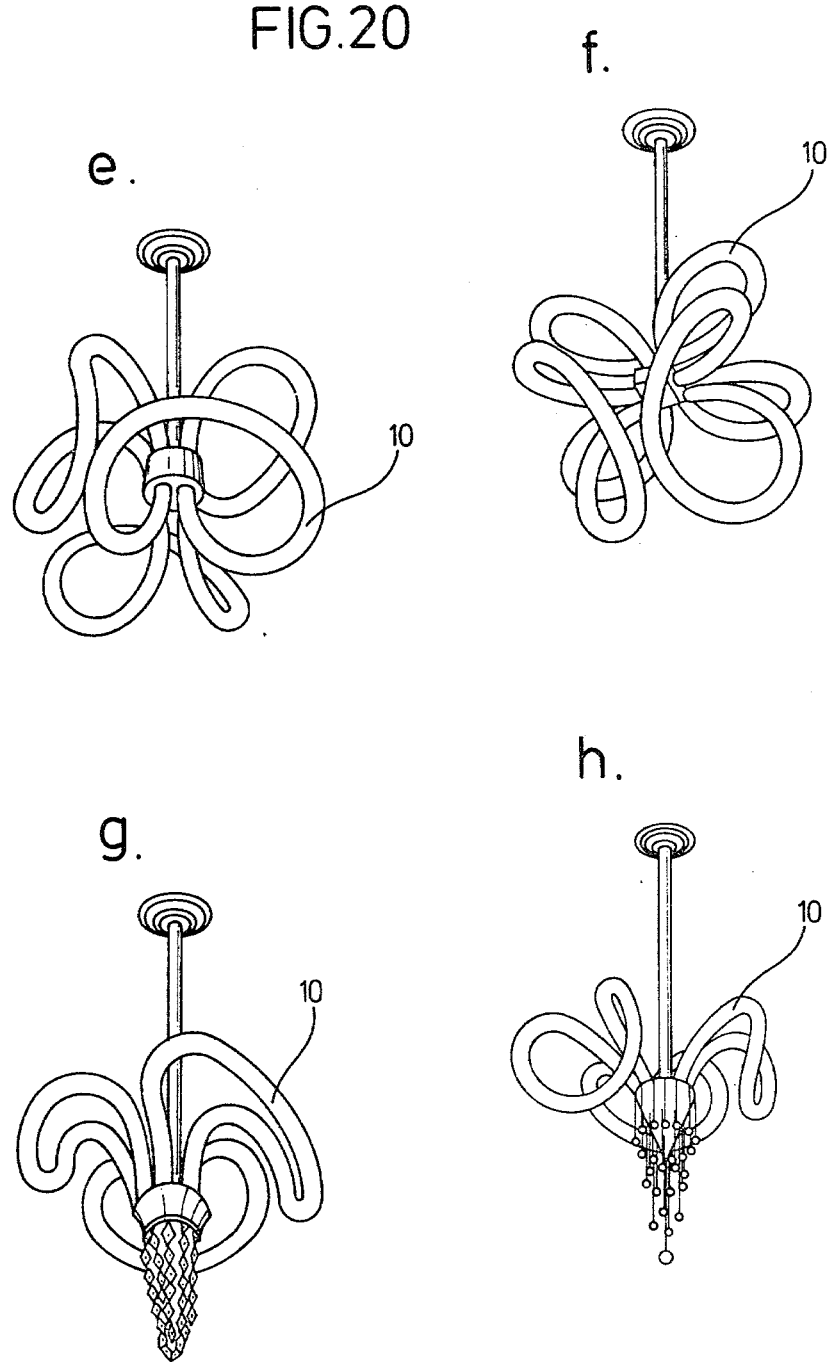
FIGS. 20a to 20h are perspective views of the lightening fixture fabricated with use of one or more bent fluorescent lamps obtained in accordance with the present invention.

Namely, in FIGS. 16 to 18, a typical embodiment of the end cap of the invention is illustrated. The end cap 112 comprises a casing of synthetic material which at its one side portion is provided with two openings 114, 114 for receiving the opposite ends of the fluorescent lamp. In the other side portion of the casing 112 is provided a recess 113 for providing electrodes 116 to which lead wires 118 derived from the ends of the lamp 10 are connected as shown in FIG. 18. For convenience in manufacture and treatment of the end cap, it may be divisible into two parts.

Figure 19:
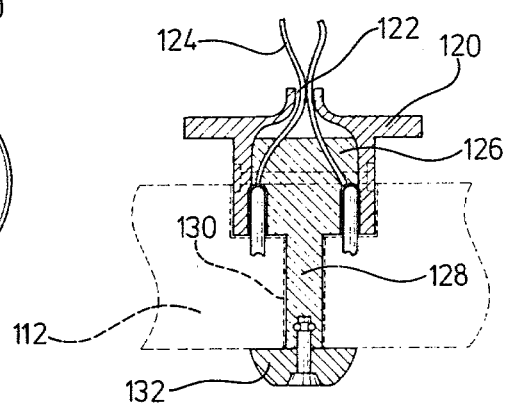
FIG. 19 is a sectional view of an electric connecting terminal connected with a plug socket.

FIG. 19 illustrates an example of a receptacle coupled with the end cap 112. This receptacle comprises a covering 120 having an opening 122 for passing electric wires 124 which are connected to a plug 126 fixed to the covering 120. A part of the plug 126 is extended to provide a projection 128 which is inserted into an opening 130 provided in the end cap 112. To a tip end of the projection 128 is secured a locking member 132 for fixing the receptacle to the end cap 112.

As best shown in FIGS. 20a to 20h, two or more bent fluorescent lamps obtained in accordance with the present invention may be used in combination to provide a fluorescent lamp of intricate pattern and design like a chandelier of incandescent lamps.

As hereinbefore fully described, in accordance with the invention, a fluorescent lamp of bent configuration other than the circline may be obtained conveniently by merely incorporating a bending mechanism into the conventional machines for producing the fluorescent lamp without substantially increasing the cost.

While certain preferred embodiments of the invention have been illustrated by way of example in the drawings and particularly described, it will be understood that modifications may be made in the constructions and that the invention is no way limited to the embodiments shown.

What is claimed is:

1. A method of forming a shaped fluorescent light bulb comprising the steps of supporting a tubular envelope blank of defined length at each of its ends within a respective holder, heating said elongated envelope blank to a degree permitting the bending of the ends with respect to its central portion, maintaining one of said holders in stationary position and moving the other of said holders relative to said one holder in a planetary path of approximately 250° with respect to the stationary holder by which the associated ends of said tubular envelope blank are turned in the same direction, relatively inward in opposition to each other and are directed toward said center portion and out of the plane of the center portion, continuing the movement of said other holder until the ends of said tubular envelope blank at least in part overly the center portion, are symmetrical and lie at least in part parallel to each other, removing said envelope blank from said holders and thereafter installing electrical connectors to each end and sealing said envelope blank to form a light bulb.

2. The method according to claim 1 wherein said planetary path bends the ends of said envelope blank to the same side of said central portion.

3. The method according to claim 1 including the step of moving said other holder axially relative to said one holder to stretch the ends of said elongated envelope with respect to the center thereof.

4. The method according to claim 1 including the step of supporting the center portion of said elongated envelope, during bending of the ends thereof on a movable member, said member being movable in a predefined curved path to define the shape of said center position.

5. The method according to claim 1 including the step of maintaining said elongated tube under internal pressure during heating and bending to prevent distortion thereof.

* * * * *